No. 791,673. PATENTED JUNE 6, 1905.
F. P. COX.
ELECTRIC METER.
APPLICATION FILED MAR. 2, 1903.
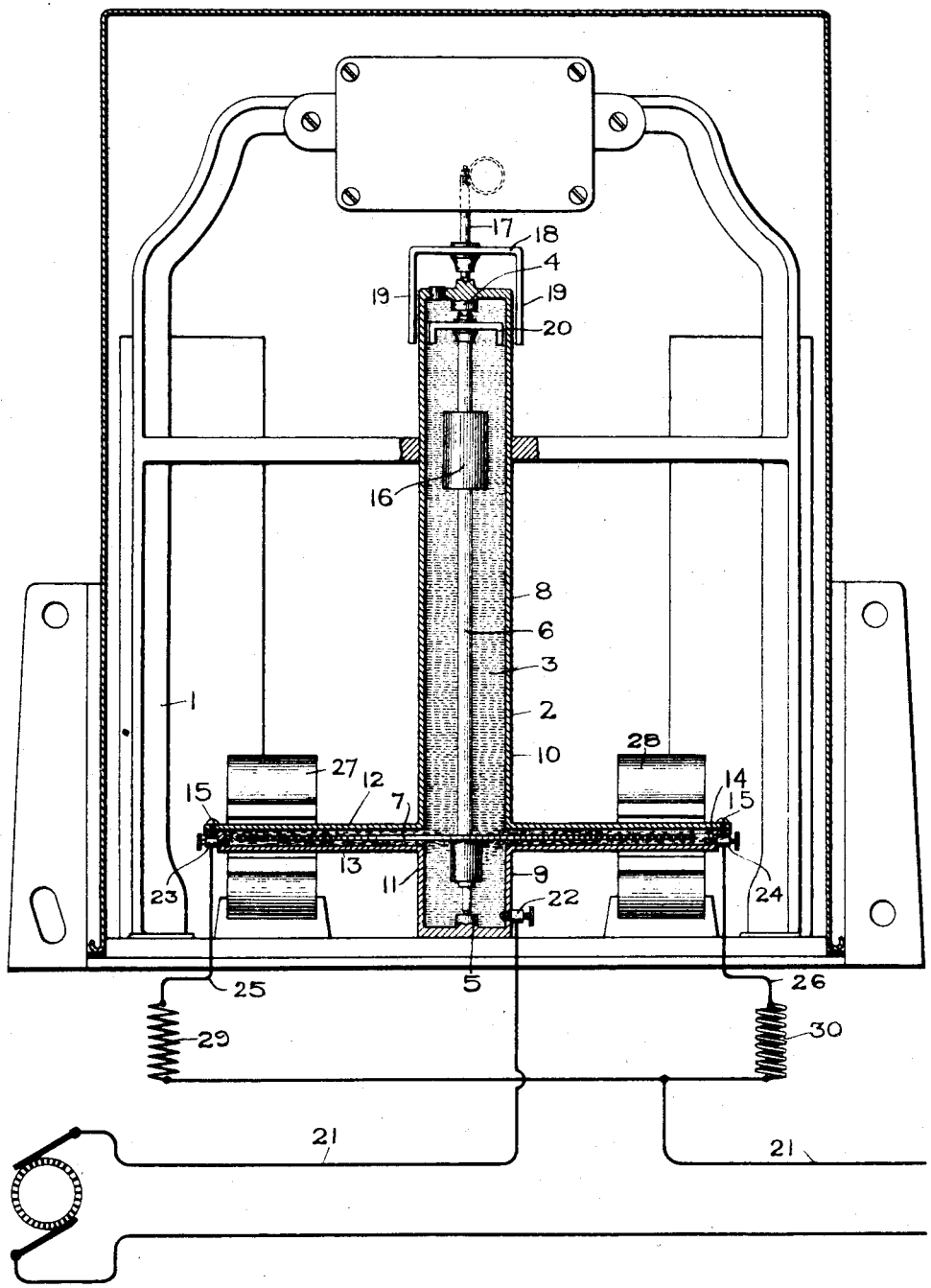

No. 791,673. Patented June 6, 1905.

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

ELECTRIC METER.

SPECIFICATION forming part of Letters Patent No. 791,673, dated June 6, 1905.

Application filed March 2, 1903. Serial No. 145,639.

*To all whom it may concern:*

Be it known that I, FRANK P. COX, a citizen of the United States, residing at Lynn, county of Essex, State of Massachusetts, have invented certain new and useful Improvements in Electric Meters, of which the following is a specification.

My invention relates to an electric meter in which a current-carrying movable member floats in some conducting fluid, such as liquid mercury. Heretofore in the construction of meters of this character the shaft connecting the movable element of the indicating mechanism has been extended above the surface of the fluid in which the movable element of the meter has been submerged. I have found that the construction and operation of meters of this character can be improved by entirely submerging both the movable element of the meter and its shaft. Among other advantages obtained by this construction the skin-friction between the submerging fluid and the shaft where the shaft leaves the surface of the mercury, which would otherwise exist, is done away with. The meter may also be prepared more readily for shipment.

With my improved meter the motion of the movable element of the meter is transmitted to the indicating mechanism by means of the magnetic attraction existing between a mass of magnetic material carried by the shaft and another mass of magnetic material outside of the submerging fluid connected to the indicating mechanism.

My meter also possesses novel means for making its accuracy independent of temperature variations and for preventing the injurious amalgamation of the connecting-leads.

Other characteristic features possessed by my improved meter will be pointed out in the specification, in which I have hereinafter described in detail one embodiment of my invention.

The accompanying drawing is a sectional elevation showing my improved meter.

Referring to the drawing, a supporting-frame 1 of ordinary construction supports the operative mechanism of the meter. Upon the support 1 is mounted the casing 2, holding the conducting fluid 3. This fluid is preferably mercury. Bearings 4 and 5 are formed on the inside of a casing at the top and bottom, respectively. The movable element or member of the meter comprises a shaft 6, pivoted between these bearings and having mounted upon it a current-carrying member 7, which is a disk of conducting non-magnetic metal. Preferably the material out of which the disk is made is copper; but other metals may be used. In order to prevent an excessive upward pressure against the bearing 4 due to difference in the specific gravities of the mercury and the movable element, a weight 16, of some suitable material, such as tungsten, heavier than the submerging fluid, is carried by the shaft. This weight is also submerged.

In the construction which I have shown in the drawing the casing 2 is formed in two sections 8 and 9, and the sections comprise central tubular portions 10 and 11, respectively, and circular substantially plane portions 12 and 13 at right angles thereto. In addition the lower section 9 is formed with a tubular portion 14 at the periphery of the plane portion 13. The plane portions 12 and 13 are separated by the tubular portion 14 to form a cylindrical space in which the disk 7 is placed. These portions are so proportioned that the distance separating the disk from the portions 12 13 14 is comparatively small. The sections are secured together by screws 15 to form a tight joint. The casing may be formed of suitable non-magnetic material, such as copper, brass, or aluminium.

A shaft 17, extending in alinement with the shaft 6, is pivoted externally of the casing 2 at the upper end of the tubular portion 10 and is geared to the indicating mechanism of the meter. The shaft 17 carries a U-shaped piece of magnetic metal 18. The legs 19 of the U-shaped portion straddle the tubular portion 10 of the casing 2. The shaft 6 carries a piece of magnetic material 20, which extends transversely to the shaft to near the inner surface of the inclosing casing. One or both of the members 18 and 20 are permanently magnetized. Hence any rotation of the shaft 6 will cause a corresponding rotation of the shaft 17.

The meter is shown in the drawing as employed to measure the current flowing in the line 21. One side of this line is connected to the binding-post 22, carried by the tubular portion 11 of the casing. The other side of the line is connected to binding-posts 23 and 24 through branch conductors 25 and 26, respectively. The binding-posts 23 and 24 are carried by the tubular portion 14 of the casing and are shown as diametrically opposed to one another. Within the meter the load current-flow is in two paths, one between the binding-posts 22 and 23 and the other between the binding-posts 22 and 24, and the current in each path is carried partly by the casing, partly by the mercury, and partly by the disk 7.

Magnets 27 and 28 are placed with their poles upon opposite sides of the portion of the casing which incloses the disk 7 in such position that the fields of force produced by them traverse the space through which the current flowing between the posts 22 and 23 and 22 and 24, respectively, passes. The reaction between the flux or lines of magnetic force and the currents in the two paths produce torques tending to turn the disk, as is well understood, and the magnets 27 and 28 have their poles so placed that they both act upon the current carried by the disk to produce a rotation of the disk in the same direction.

The principal retarding force acting upon the disk 7, tending to restrain its rotation, is that due to the eddy-currents caused in the disk by its movement through the fields of the magnets 27 and 28. The effect of increasing the temperature of the disk from any cause is to increase its electrical resistance. This cuts down the eddy-currents, and so reduces the retarding forces, tending to restrain the rotation of the disk. As a result of this there is a tendency for a meter of this character to run too fast when the disk is heated in any manner. The heating of the meter may arise from the current carried or from the location in which it is placed. To avoid this error, I have made the magnet 28 stronger than the magnet 27, and I have placed resistances 29 and 30 in the lines 25 and 26, respectively. The resistance 30 is made out of some material, such as iron wire, which has a high temperature coefficient. The resistance 29 may be made out of some material, such as German silver, having a very low coefficient of resistance, or it may be made out of some material, such as graphite, which has a negative temperature coefficient. As a result of this construction a change of temperature disturbs the distribution of the current between the lines 25 and 26. When the temperature of the system is raised, more of the current passes through the resistance 29 and less through the resistance 30. The current passing through the resistance 29 passes through the field produced by the weaker magnet 27. The result of this change in division of the current therefore is to reduce the torque tending to rotate the disk 7. A decrease in temperature will of course produce an opposite change in the current distribution and torque. If the resistances 29 and 30 and the strengths of the magnets 27 and 28 are correctly proportioned, a meter may be obtained in which the changed retarding effect, due to a change in the temperature of the disk 7 and resistances 29 and 30, will be exactly met by a corresponding change in turning torque.

The binding-posts 22, 23, and 24 are preferably made of iron or other non-amalgamating metal, as when made of the ordinary material, such as copper or brass, or when the wires 21, 25, and 26 are directly connected to the mercury, there is a tendency for the mercury to amalgamate with the wires, rendering them brittle and destroying their tensile strength. This difficulty is avoided by making the binding-posts of iron. Instead of making the binding-posts of iron I may place a section of iron or other non-amalgamating metal at some other point in the meter-circuit.

It will of course be understood that the resistance of the casing should be of such an amount that a current of suitable strength will pass through the disk 7. In some instances it may be desirable to make the casing of non-conducting material, in which case an external shunt may be employed to reduce the current passing through the meter or not, as desired.

The instrument which I have illustrated in the drawing is of the recording type; but it is obvious that some of the features of novelty are equally applicable to instruments which do not record.

While I have illustrated and described the best form of my invention which is now known to me, I do not intend to be limited to the exact construction and arrangement shown and described, as I do not consider that my invention in its broader aspects is limited thereto.

What I claim as new, and desire to secure by Letters Patent of the United States, is—

1. In combination, a casing containing mercury, said casing being made out of some substance which amalgamates with mercury, and electrical contacts carried by said casing formed out of a metal which does not amalgamate with mercury.

2. In an electric meter, a casing, a mass of mercury contained therein, a movable element totally submerged in said mercury, said movable element comprising a disk of conducting material and a shaft therefor, and a weight of some material heavier than mercury carried by said movable element and tending to hold it submerged.

3. In combination, a current-carrying member, means for producing magnetic fluxes traversing different portions of said member, said magnetic fluxes being of unequal intensity, means for causing current to flow through the portions of said member traversed by said fluxes, and means for varying the distribution of current-flow through said member upon a variation of temperature.

4. In a meter, a rotatable element, a pair of magnets with their poles embracing portions of said element, means for causing a flow of electricity through said element in two paths, one of said paths being located between the poles of one of said magnets, the other of said paths being located between the poles of the other of said magnets, and means for automatically varying the distribution of current between the two paths upon a variation of temperature of the meter.

5. In a meter, a current-carrying element, means for producing a plurality of magnetic fluxes traversing different portions of said element, said magnetic fluxes being of unequal intensity, means for producing a flow of current through said element in a plurality of paths, each of said paths being through the space traversed by one of the magnetic fluxes, and resistances located in some of the paths, the resistances in different paths having different temperature coefficients.

6. In an electric meter, the combination of a movable member submerged in a fluid of a specific gravity higher than that of the said member, and a mass of some material having a specific gravity higher than that of the fluid connected to said element and also submerged in said fluid.

7. In an electric meter, a pivoted member, two torque-producing circuits coöperating therewith, and thermal responsive means included in said circuits for varying the current distribution between the two circuits.

8. In an electric meter, the combination with the main armature-circuit, of a branch circuit forming also a path for torque-producing current and having in its circuit a metal whose temperature coefficient is less or different from that of the main armature-circuit to produce a compensation for changes of temperature.

9. In an electric meter, a pivoted member, two torque-producing circuit portions in operative relation therewith, and thermal responsive means for varying the current distribution between the two circuit portions.

10. In a mercury motor-meter, the combination with two main-circuit armature-paths of means responsive to changes in temperature, for automatically changing the distribution of current in said circuits, as and for the purpose described.

11. In a meter, two current armature-paths, means for creating a magnetic field in operative relation with one of said paths and for creating a magnetic field of different strength in operative relation with the other of said paths, and means for varying the ratio of the currents flowing through said paths.

12. In a meter, the combination of two armature-paths carrying torque-producing load-currents, and means for varying the ratio of the torques produced by the currents flowing through said paths.

13. In an electric meter, the combination with two armature-paths having different torque-producing effects, of a loop or branch connecting said paths and embodying a metal having a lower temperature coefficient than the armature-paths themselves.

14. In a mercury motor-meter, the combination of two armature-circuits, with means responsive to variations of temperature for automatically varying the proportion of current in said circuits to increase the torque of the armature on a decrease of temperature.

15. In a meter of the type described, the combination of two main-current armature-paths in multiple and in which the currents conspire to produce rotation, and means for adjusting the proportion of current flowing through said paths.

16. In a meter of the type described, the combination of two main-current armature-paths in which the currents conspire to produce rotation, and means for adjusting the proportion of current flowing through said paths.

17. In a mercury motor-meter, the combination with a main armature-current path, of a second armature-current path producing a lesser torque, and means for changing the distribution of current in said paths to adjust the action of the meter.

18. In an electric meter, a receptacle, a disk of conducting material rotatably mounted therein, a body of conducting fluid contained by the receptacle in contact with the disk, means for establishing electrical connections between the fluid and an outside conductor at two different points adjacent the periphery of the disk, a second conductor also electrically connected to the conducting fluid, means for causing current to flow from one conductor to the other conductor through the conducting fluid and disk in two paths, one of said paths being between one of said points and said second conductor and the other of said paths being between the other of said points and the second conductor, and means for causing magnetic lines of force to intersect said paths, the density of the lines intersecting one path being greater than the density of the lines intersecting the other of said paths.

19. In an electric meter, a receptacle, a disk of conducting material rotatably mounted therein, a body of conducting fluid contained by the receptacle in contact with the disk, means for establishing electrical connections between the fluid and an outside conductor at two different points adjacent the periphery of the disk, a second conductor also electrically connected to the conducting fluid, means for causing current to flow from one conductor to the other through the conducting fluid and disk in two paths, one leading from each of said points, and means for creating magnetic lines of force in coöperative relation with said current-paths, the density of the lines in coöperative relation with one of said paths being greater than the density of the lines in coöperative relation with the other of said paths.

20. In an electric meter, the combination with two armature-paths carrying the load-current and having different torque-producing effects, of a loop or branch conductor connecting said paths.

In witness whereof I have hereunto set my hand this 26th day of February, 1903.

FRANK P. COX.

Witnesses:
DUGALD McK. McKILLOP,
OTTO F. PERSSON.